United States Patent [19]
Allcock et al.

[11] Patent Number: 5,567,783
[45] Date of Patent: Oct. 22, 1996

[54] POLYPHOSPHAZENES BEARING CROWN ETHER AND RELATED PODAND SIDE GROUPS AS SOLID SOLVENTS FOR IONIC CONDUCTION

[75] Inventors: Harry R. Allcock; Stephen J. M. O'Connor; Mark E. Napierala; Charles G. Cameron; David Olmeijer, all of State College, Pa.

[73] Assignee: The Penn State Research Foundation, University Park, Pa.

[21] Appl. No.: 400,061

[22] Filed: Mar. 7, 1995

[51] Int. Cl.$^6$ ............................ C08G 79/02; C08G 79/04
[52] U.S. Cl. ........................ 525/538; 525/417; 528/399
[58] Field of Search ............................ 528/399; 525/417, 525/538

[56] References Cited

U.S. PATENT DOCUMENTS

| | | | |
|---|---|---|---|
| 4,179,553 | 12/1979 | Hergenrother | 528/399 |
| 4,656,246 | 4/1987 | Chang | 528/399 |

OTHER PUBLICATIONS

D. E. Fenton et al., Polymer, vol. 14, p. 589 (1973).
P. V. Wright, Br. Polym. J., 7, pp. 319–327 (1975).
P. V. Wright, Journal of Polymer Science, Polymer Physics Edition, vol. 14, pp. 955–957 (1976).
M. B. Armand et al., Vashishta, Mundy, Shenoy, eds. Fast Ion Transport in Solids, pp. 131–136 (1979).
J. S. Foos et al., J. Electrochem. Soc., vol. 134, No. 7, pp. 1724–1726 (Jul. 1987).
G. Goulart et al., "Polydioxolane as Solvating Host Polymer", pp. 99–105, Laboratoire d'Lonique et d'Electrochimie du Solide de Grenoble, Cedex, France.
J. R. M. Giles et al., "Examination of Ionic Conduction in an Oxyalkane Copolymer", pp. 329–334.
John R. Craven et al., Makromol. Chem., Rapid Commun. 7, pp. 81–84 (1986).
Christian V. Nicholas et al., British Polymer Journal, 20, pp. 289–292 (1988).
E. Linden et al., Solid State Ionics 28–30, pp. 994–1000, (1988) North–Holland, Amsterdam.
Fiona M. Gray, Solid State Ionics 40/41, pp. 637–640, (1990) North–Holland.
P. Passiniemi et al., Solid State Ionics 28–30, pp. 1001–1003, (1988) North–Holland, Amsterdam.
Peter M. Blonsky et al., J. Am. Chem. Soc., 106, pp. 6854–6855 (1984).
John M. G. Cowie et al., Makromol. Chem., Rapid Commun. 9, pp. 387–391 (1988).
J. M. G. Cowie et al., Polymer Communications, vol. 29, pp. 126–127 (1988).
M. Andrei et al., Electrochimica Acta, vol. 37, pp. 1545–1549 (1992).
Darmasena Peramunage et al., American Chemical Society, Macromolecules, 22, pp. 2845–2849 (1989).
H. R. Allcock et al., Journal of the American Chemical Society, 87:18, pp. 4216–4217 (Sep. 20, 1965).
H. R. Allcock et al., Inorganic Chemistry, Phosphonitrilic Compounds, vol. 5, No. 10, pp. 1709–1715 (Oct. 1966).
H. R. Allcock et al., Inorganic Chemistry, Phosphonitrilic Compounds, vol. 5, No. 10, pp. 1716–1718 (Oct. 1966).
B. L. Papke et al., J. Electrochem. Soc.: Electrochemical Science & Technology, vol. 129, No. 8, pp. 1694–1701 (Aug. 1982).
Fernando Montanari et al., J. Org. Chem., 47, pp. 1298–1302 (1982).
Rose Ann Schultz et al., J. Am. Chem. Soc., 107, pp. 6659–6668 (1985).

*Primary Examiner*—David Buttner
*Attorney, Agent, or Firm*—Thomas J. Monahan

[57] ABSTRACT

Polyphosphazene polymers having crown ether and related podand side groups have been prepared. The polymers are useful as solid solvents for ionic conduction. Branched polyphosphazene polymers having the formula $[NP(OCH_2CH(CH_2O(CH_2CH_2O)_mR)(O(CH_2CH_2O)_mR))_2]_n$, as well as the corresponding crown ether polyphosphazenes, were synthesized where m=0–3 and R is C1–C4 alkyl. The physical properties of these polymers were compared with the related polymer poly[bis(2-(2-methoxyethoxy)-ethoxy) phosphazene], MEEP. Also, a series of poly(organophosphazenes) which bear oligoethylenoxy side groups has been synthesized and characterized. The polymers have the general formula $[NP(O(CH_2)_mCH_3)_x(OCH_2CH_2OCH_2CH_2OCH_3)_y]_n$, where x and y are approximately 1 and m ranges from 1–20.

9 Claims, 2 Drawing Sheets

POLYPHOSPHAZENES BEARING CROWN ETHER AND RELATED PODAND SIDE GROUPS AS SOLID SOLVENTS FOR IONIC CONDUCTION

GOVERNMENT SPONSORSHIP

This invention was made with Government support under Grant No. MSS-9212275 awarded by the National Science Foundation. The Government has certain rights in the invention.

BACKGROUND OF THE INVENTION

The present invention relates to novel polyphosphazene polymers having crown ether and related podand side groups. The polymers of the invention are useful as solid solvents for ionic conduction.

The beginning of the research field of solid polymer electrolytes (SPEs) can be traced back in time to the early 1970s when Wright (Fenton, D. E.; Parker, J. M.; Wright, P. V. *Polymer* 1973, 14, 589) (Wright, P. V. *Br. Polym. J.* 1975, 7, 319) (Wright, P. V. *J. Polym. Sci.; Polym. Phys.* 1976, 14, 955) discovered the ionic conductivity of poly(ethylene oxide), (PEO), containing dissolved inorganic salts such as KSCN. In 1978 Michael Armand (Armand, M. B.; Chabagno, J. M. and Duclot, M. Second International Meeting on Solid Electrolytes, St Andrews, Scotland, 20–22 Sep., 1978, Extended Abstract) (Annand, M. B.; Chabago, J. M.; Duclot, N. J. in Fast Ion Transport in Solids; Vashishta, P.; Mundy, J. N.; Shenoy, G. K. Eds. North Holland. 1979, 131) was the first to suggest the use of poly(ethylene oxide) as a solid solvent for rechargeable high energy storage batteries. Since then the field has rapidly grown to encompose a world wide range of research involving organic synthesis, polymer chemistry and physical chemistry, especially electrochemistry.

Poly(ethylene oxide) has, over the last 20 years, been extensively studied as an ionic conducting material, as shown in Chart 1 below.

Chart 1

Structures of poly(ethyleneoxide), PEO, (1) and poly[bis(2-(2-methoxy-ethoxy)ethoxy)phosphazene], (2), MEEP,

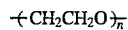

Poly(ethyleneoxide), PEO,

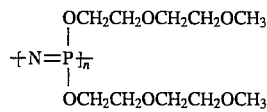

Poly[bis(2-(2-methoxyethoxy)phosphazene], MEEP, (2)

The oxygen atoms contained in the backbone of PEO can datively coordinate to metal cations and thus form a variety of salt complexes with metal salts such as lithium triflate ($LiSO_3CF_3$). The coordinating ability of PEO also facilitates ion-pair separation of disolved salts, and hence allows conduction of the free ions to occur. However, the level of conductivity also depends on the degree of crystallinity and molecular flexibility of the polymer system. A flexible polymer will allow high ion mobility and hence promote high ionic conductivity. The presence of crystalline domains in the polymer will impede ion mobility acting as blocks to the paths of ions and reducing the polymer flexibility. The three basic property requirements for polymers to act as solid polymer electrolytes are as follows:

(a) the polymer should exhibit a low glass transition temperature ($T_g$),
(b) the polymer should be amorphous and
(c) should possess cation or anion coordinating sites to assist in the process of salt solvation and ion-pair separation.

Poly(ethylene oxide), PEO, (1) has a crystalline melting temperature of 65° C. and does not become wholly amorphous untill heated above 100° C. Hence, PEO is only an effective ionic conductor at 100° C. or above. At room temperature the conductivity is significantly reduced due to the presence of crystallinity. The room temperature crystalline behaviour of PEO is a major disadvantage and has prompted many workers to attempt to modify the properties of PEO with the aim of eliminating the presence of crystallinity (Foos, J. S. and Erker, S. M., *J. Electrochem. Soc.* 1987, 134, 1724) (Goulart, G.; Sylla, S.; Sanchez, J. V. and Armand, M. B. in Second International Symposium on Polymer Electrolytes; Scrosati, B. Ed., Elsevier, London, 1990, 99) (Giles, J. R. M., Booth, C. and Mobbs, R. H. Transport-Structure Relations in Fast Ion and Mixed Conductors, in Proceedings, 6$^{th}$ Risö International Symposium on Metallurgy and Materials Science; Poulsen, F. W.; Anderson, N. H.; Clausen, K.; Skaarup, S. and Sörensen, O. T. Eds. Risö, National Lab., Roskilde, 1985, 329. Clausen, S) (Craven. J. R.; Mobbs, R. H.; Booth, C. and Giles, J. R. M., *Makromol. Chem. Rapid. Commn.* 1986, 7, 81) (Nicholas, C. V.; Wilson, D. J.; Booth, C and Giles, J. R. M., *Br. Polym. J.* 1988, 20, 289) (Linden, E. and Owen, J. R., *Solid State Ionics*, 1988, 28–30, 994) (Gray, F. M., Solid State Ionics, 1990, 40/41, 637) (Passiniemi, P.; TakkumŠki, S.; Kankare, J. and SyrjŠmŠ, M., Solid State Ionics, 1988, 28–30, 1001) (Przyluski, J.; Wieczorek, W.; Florjanczyk, Z. and Krawiec, W. Second Interantional Synposium on Polymer Electrolytes (ISPE-2), Siena, Jun. 14–16, 1989, Extended Abstracts, 56).

In the mid 1980s poly[bis(2-(2-methoxyethoxy)ethoxy)] phosphazene, 2, shown in Chart 1 also known as MEEP was first synthesized and studied as a polymer electrolyte by Allcock and Shriver et al (Blonksky, P. M.; Shriver, D. F.; Austin, P. E. and Allcock, H. R., *J. Am. Chem. Soc.* 1984, 106, 6854). The polymer is amorphous and when containing dissolved $LiSO_3CF_3$ or $AgSO_3CF_3$ salts was found to exhibit room temperature conductivities of up to three orders of magnitude higher than poly(ethylene oxide), PEO. This behavior is attributed to the high polymer backbone flexibility (low $T_g$, −84° C.) and high solvation or coordinating power to cations of the etheric side groups. This material has since been extensively studied as a solid polymer electrolyte by numerous other workers.

An object of this invention was to further investigate the properties of new polyphosphazene electrolytes. In particular, the effect of side chain structure on the final physical polymer properties, such as $T_g$, crystallinity, ionic mobility and conductivity were evaluated. The side chain structure can significantly influence the $T_g$ and the degree of polymer crystallinity, which in turn strongly influences the ionic conductivity of the polymer/salt complex system.

SUMMARY OF THE INVENTION

The following new branched polymers were synthesized: $[NP(OCH_2CH(CH_2O(CH_2CH_2O)_mR)(O(CH_2CH_2O)_mR))_2]_n$ where m=0–3, n~15,000, R=$CH_3$, and where m=1, n~15,000, R=$(CH_2)_3CH_3$. The following polymers containing linear ethyleneoxy side groups were synthesized: $[NP(O(CH_2CH_2O)_mCH_3)_2]_n$. The physical properties of these new polymers were compared with the related polymer poly[bis(2-(2-methoxyethoxy)ethoxy)phosphazene], MEEP. All polymers are soluble in a wide range of organic solvents and are soluble in water. The lower critical solution temperatures (LCST) of these polymers in water also measure and compared with MEEP. All polymers were complexed with lithium triflate and the ionic conductivities measured which in certain cases were an improvement over that of MEEP.

A series of poly(organophosphazenes) which bear oligo-ethylenoxy side groups has been synthesized and characterized. The polymers have the general formula $[NP(OR)_x(OCH_2CH_2OCH_2CH_2OCH_3)_y]_n$, where n=15,000, x and y are approximately 1 and R is equivalent to O—$(CH_2)_m$—$CH_3$ where m ranges from 2 to 9. Structural characterization for all polymers was achieved with the aid of $^1H$, $^{13}C$ and $^{31}P$ NMR, gel permeation chromatography and elemental analysis. The thermal properties of all pure polymer samples were studied by differential scanning calorimetry. The ionic conductivity of $[NP(O\{CH_2\}_9CH_3)_1(\{OCH_2CH_2\}_2OCH_3)_1]_n$ complexed with $LiSO_3CF_3$ in the range 18:1–1.5:1 polymer to salt mole ratio was measured. The optimum salt loading of 9.24:1 was used in the above mixed substituent to investigate the effect of the cosubstituent on conductivity. The thermal properties of all complexed polymer samples were examined with the use of DSC.

DETAILED DESCRIPTION OF THE INVENTION

Various examples are offered to illustrate particular embodiments of the invention but are not intended to be limitative thereof.

POLYPHOSPHAZENES BEARING BRANCHED, LINEAR AND CYCLIC ETHERIC GROUPS

Figure 1:
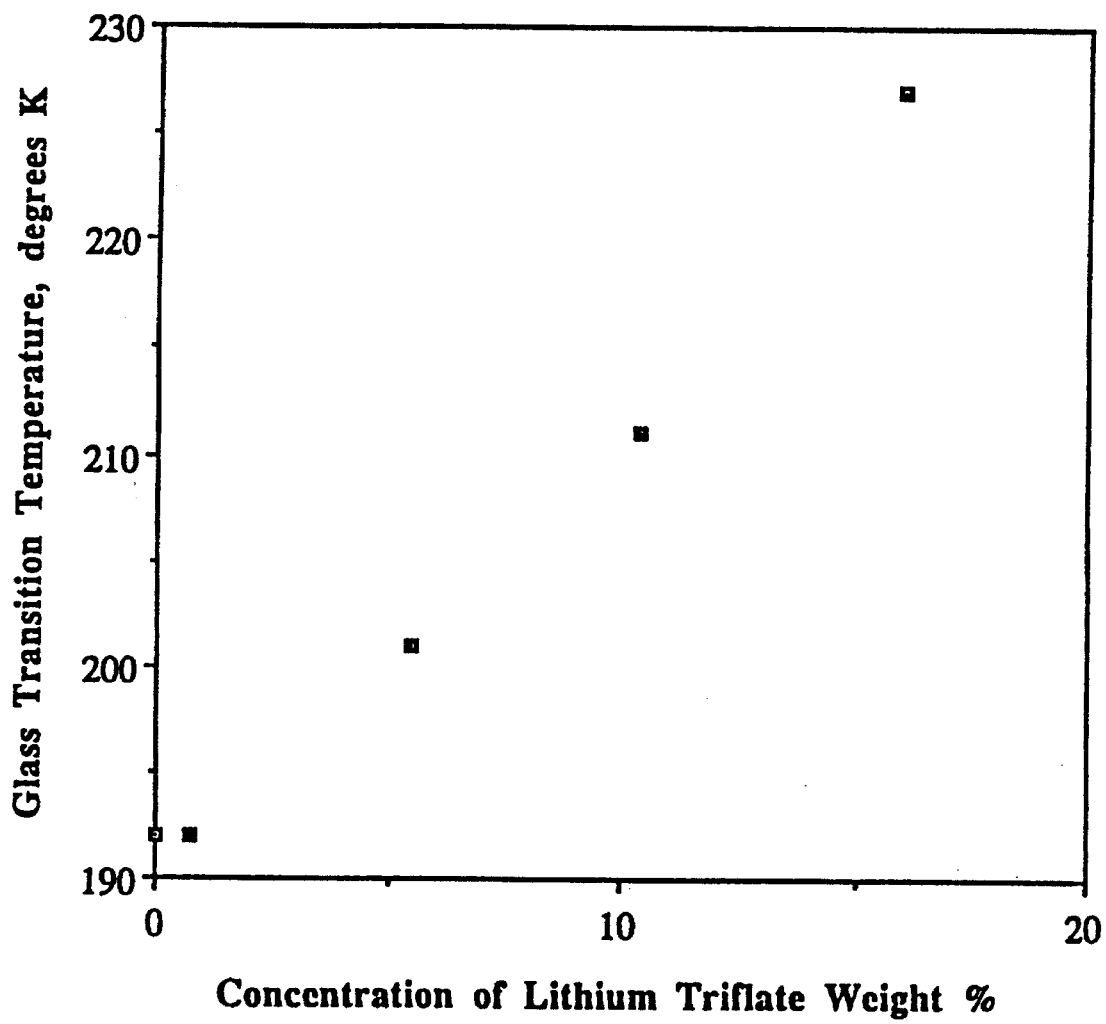
FIG. 1 is the conductivity of polymer 9 complexed with lithium triflate as a function of lithium triflate concentration.

A series of polyphosphazenes were prepared containing either linear etheric, branched etheric (podand) or cycloaliphatic ethers (crown ethers). The polymers to synthesized are shown in Charts 2, 3 and 4.

Chart 2

Polyphosphazenes Bearing Podand Side Groups

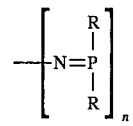

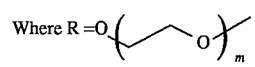

When m = 1 polymer 3
when m = 2 polymer 4
when m = 3 polymer 5
when m = 4 polymer 6
when m = 6 polymer 7

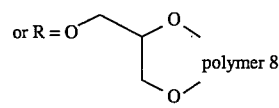

polymer 8

Chart 3

Polyphosphazenes Bearing Podand Side Groups

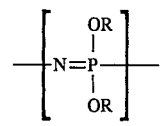

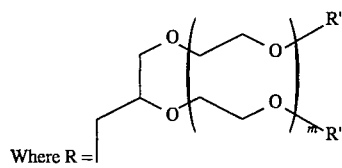

When m = 1 and R' = —$CH_3$ polymer 9
when m = 1 and R' = —$(CH_2)_3CH_3$ polymer 10
when m = 1 and R' = —$CH(CH_3)_2$ polymer 11
when m = 2 and R' = —$CH_3$ polymer 12
when m = 3 and R' = —$CH_3$ polymer 13

Chart 4

Polyphosphazenes Bearing Crown Ether Side Groups

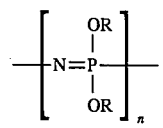

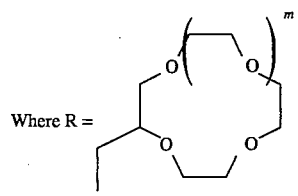

when m = 1 polymer 14
when m = 2 polymer 15
when m = 3 Polymer 16

Polymers 3–6, 9, 12 and 13 were fully characterized and an attempt to correlate polymer structure with ionic conductivity of salt/polymer complexes.

There have only been a small number of reports in the literature (Cowie, J. M. G. and Sadaghianizadeh, K. *Makromol. Chem., Rapid Commn.* 1988, 9, 387) (Cowie, J. M. G. and Sadaghianizadeh, K. *Polym. Commn.* 1988, 29, 126) (Andrel, M,; Cowie, J. M. G. and Prosperi, P. *Electrochimica Acta.* 1992, 73, 9, 1545) of polyphosphazene electrolytes containing aliphatic crown ether side groups. Previous studies involving polyphosphazene bearing crown ether side groups have been carried out by Cowie (Cowie, J. M. G. and Sadaghianizadeh, K. *Makromol. Chem., Rapid Commn.* 1988, 9, 387) (Cowie, J. M. G. and Sadaghianizadeh, K. *Polym. Commn.* 1988, 29, 126) and co-workers. Cowie et al (Andrel, M,; Cowie, J. M. G. and Prosperi, P. *Electrochimica Acta.* 1992, 73, 9, 1545) have also synthesized cosubstituted polyphosphazenes bearing trifluoroethoxy and 12-crown-4 side groups, the degree of substitution was between 50 and 80%. The highest room temperature conductivity obtained for these systems was (Andrel, M,; Cowie, J. M. G. and Prosperi, P. *Electrochimica Acta.* 1992, 73, 9, 1545) $10^{-5}$ Scm$^{-1}$.

Fernandez et al (Darmasena, P.; Fernandez, J. E. and Garcia-Rubio, L. H. *Macromolecules* 1989, 22, 2845) recently reported the synthesis and characterization of a polymer electrolyte consisting of a methacrylate backbone with 16-crown-5 ether pendant groups. The polymer formed amorphous complexes with LiClO$_4$. The conductivity of the polymer-salt complex was measured using a direct current technique and was shown to be of the order of $2\times10^{-7}$ Scm$^{-1}$ at 60° C.

There have been no reports in the literature of homopolymers based on phosphazenes containing 12-crown-4, 15-crown-5 or 18-crown-6 side groups. The side groups should, due to their particular crown cavity dimensions, have the maximum binding capacity to lithium, sodium and potassium ion respectively. The increased binding power of the crown ether moieties to the metal cations will consequently increase the ion-pair separation of dissolved salts. A systematic study of these types of polymer systems complexed with lithium, sodium and potassium triflates is presented.

Polyphosphazenes beating branched etheric side groups, polymers 9, 12 and 13, illustrated in Chart 3, are analogous to polymers 14 and 16 shown in Chart 4. The bonding structure of the side groups in polymers 4 and 7 could be looked upon as the incomplete crown ether analogs or almost isomers of 12-crown-4 and 18-crown- 6. It will be interesting to see what effect this "small" change in the side group structure has on the final polymer bulk physical properties, such as the T$_g$ and ionic conductivity. Polymers 9–12, because of their specific side group structure, may act as "virtual" crown ethers. The relatively close etheric side chains should be able to bind strongly to a metal cation, much like a crown ether. However, once bound, the side groups should also release the cation more readily than a conventional crown ether moiety, hence allowing increased ion mobility and conductivity. Polymers 9–12 will have twice the loading of flexible etheric metal ion coordinating side groups per monomer repeat unit compared with MEEP.

In this invention, non-coordinating n-alkoxy cosubstituents were introduced into the MEEP system in order to study the effect of polymer composition on properties such as the T$_g$ and the ionic conductivities. The presence of non-etheric side groups might serve to lower the glass transition of the polymer by the introduction of additional disorder and by also lowering the number of potential dipole-dipole interactions. Therefore, a polymer which bears both etheric and non-etheric groups may be more flexible than a homopolymer which bears etheric groups exclusively due to decreased inter- and intrachain dipole-dipole interactions. Although the number of coordinating oxygen atoms has been reduced, it is proposed that the T$_g$ of the polymer will be lowered by the cosubstituent resulting in an increase in side group motion.

POLYPHOSPHAZENES BEARING BRANCHED, CYCLIC AND LINEAR ETHERIC SIDE GROUPS

Polymer 9 has a glass transition temperature of −81° C., which is very similar to MEEP (−84° C.). The maximum room temperature conductivity of polymer 9, when complexed with lithium triflate, was found to be $1.2\times10^{-5}$ Scm$^{-1}$ (Table 1).

TABLE 1

Conductivity and Glass Transition Temperature Data For Polymer 9 Complexed With LiSO$_3$CF$_3$

| Salt Conc. wt % LiSO$_3$CF$_3$ | Repeat Unit/Li$^+$ Ratio | Glass Transition Temp. T$_g$ K (°C.) | Conductivity, σ, S cm$^{-1}$ |
|---|---|---|---|
| 0.00 | 0.00 | 192 (−81) | 3.08 × 10$^{-8}$ |
| 0.74 | 45.60:1 | 192 (−81) | 1.40 × 10$^{-6}$ |
| 2.68 | 12.30:1 | 195 (−79) | 6.10 × 10$^{-6}$ |
| 5.45 | 5.90:1 | 201 (−72) | 1.20 × 10$^{-5}$ |
| 10.34 | 2.90:1 | 211 (−62) | 1.12 × 10$^{-5}$ |
| 15.78 | 1.80:1 | 227 (−46) | 9.50 × 10$^{-6}$ |
| 19.69 | 1.40:1 | 228 (−45) | 7.11 × 10$^{-6}$ |
| 49.29 | 0.35:1 | 277 (+4) | — |

Figure 2:
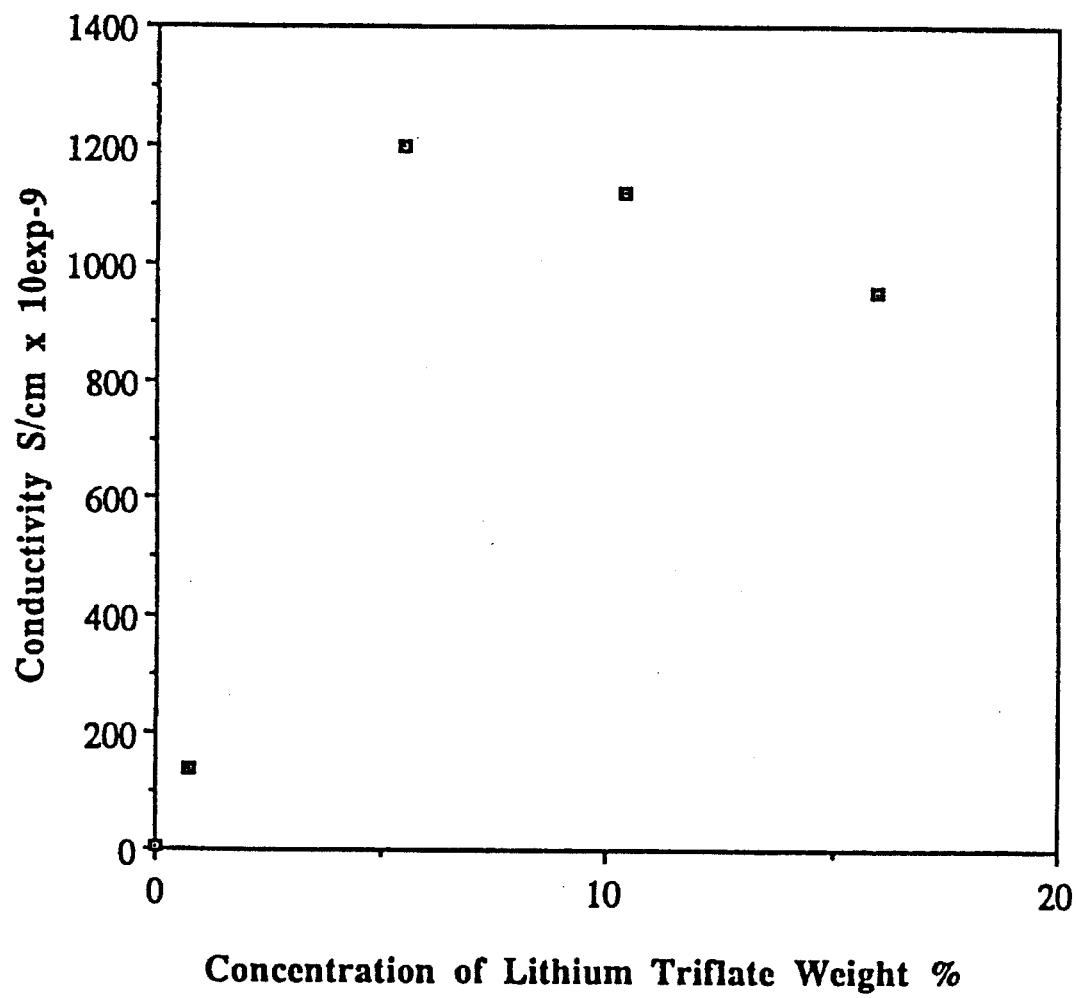
FIG. 2 is the glass transition temperature of polymer 9 complexed with lithium triflate as function of lithium triflate concentration.

Incidently, MEEP, when complexed with lithium triflate, has been reported to have a room temperature conductivity of $2.7\times10^{-5}$ Scm$^{-1}$. However, interestingly, the macroscopic properties appear quite different. At room temperature MEEP is dimensionally unstable and will flow under pressure. It requires UV or gamma-ray cross-linking to render it immobile. Polymer 9 has far greater dimensional stability compared with MEEP, it appears to have a greater room temperature macroviscosity than MEEP. However, these materials seem to have similar micro or molecular viscosities as demostrated by similar values for the glass transition temperature and conductivity. The reasons why these materials have different macro viscosities must be related to the structure of the side group. It is possible that polymer 9 has a greater degree of chain entanglement, that generates increased macro viscosity. However, the phenomenon is not fully understood and requires further investigation. The room temperature conductivity of polymer 9 as a function of lithium triflate concentration has been studied and the results are shown in FIG. 1. The optimum lithium triflate concentration for maximum conductivity appears to be approximately 5.0% by weight of lithium triflate. This concentration corresponds to a lithium ion to polymer repeat ratio of 5.9:1. The glass transition temperature of polymer 9 increases steadily with increasing salt concentration as shown in FIG. 2.

Additionally, polymer 9 has been shown to form complexes with NaSO₃CF₃. While NaSO₃CF₃ complexes of polymer 9 show the expected level of conductivity, perhaps due to lower ionic mobility, the conductivities are less impressive than with $LiSO_3CF_3$ (Table 2).

TABLE 2

Conductivity and Glass Transition Temperature Data For Polymer 9 Complexed With NaSO₃CF₃

| Salt Conc. wt % $LiSO_3CF_3$ | Repeat Unit/Li⁺ Ratio | Glass Transition Temp. $T_g$ K (°C.) | Conductivity, σ, S cm⁻¹ |
|---|---|---|---|
| 0.00 | 0.00 | | |
| 5.90 | 5.9:1 | | $9.07 \times 10^{-6}$ |

Secondly, $LiSO_3CF_3$ complexes of polymer 12 (with four additional ethyleneoxy units per polymer repeat unit) were also analyzed. The conductivity of polymer 12 was found to be approximately three times greater than that of polymer 9 at a $LiSO_3CF_3$ concentration of 5.45% by weight (Table 3).

TABLE 3

Conductivity and Glass Transition Temperature Data For Polymer 12 Complexed With $LiSO_3CF_3$

| Salt Conc. wt % $LiSO_3CF_3$ | Repeat Unit/Li⁺ Ratio | Glass Transition Temp. $T_g$ K (°C.) | Conductivity, σ, S cm⁻¹ |
|---|---|---|---|
| 0.00 | 00.00 | −81 | $7.10 \times 10^{-7}$ |
| 0.61 | 40.1:1 | — | $7.37 \times 10^{-6}$ |
| 3.54 | 6.7:1 | — | — |
| 5.45 | 4.3:1 | — | $3.75 \times 10^{-5}$ |
| 10.33 | 2.1:1 | — | — |
| 15.00 | 1.8:1 | — | — |
| 20.00 | — | — | — |
| 25.00 | — | — | — |

Note:
(i) Conductivity was measured at 25° C.
(ii) Conductivity values are the average of three separate readings derived from three different samples of the same salt concentration.

This is believed due to increased mobility of the cations dissolved in polymer 12 which is in turn due to the greater number of ethyleneoxy units. The greater conductivity of polymer 12 may reveal an increased capacity of polymer 12 for $LiSO_3CF_3$.

The glass transition temperatures for uncomplexed polymers 3 to 16, including spectroscopic and molecular weight data, are shown in Table 4.

TABLE 4

Polymer Characterization Data

| Polymer | ¹H-NMR (δ ppm) | ³¹P-NMR (δ ppm) | ¹³C-NMR (δ ppm) | $T_g$ (°C.) | $M_w$ ($M_n/M_w$) |
|---|---|---|---|---|---|
| 9 | 3.30–3.40 (s, 6H) | −8.0 | 58.59, 58.72, 66.21, 66.22, 69.63, 70.61, 70.34, 71.94, 72.11 | −81 | $1.06 \times 10^6$ (2.74) |
|   | 3.48–3.58 (s, 4H) | | | | |
|   | 3.60–3.70 (m, 4H) | | | | |
|   | 3.70–3.88 (m, 3H) | | | | |
|   | 3.90–4.10 (s, 2H) | | | | |
| 10 | | | | | |
| 11 | | | | | |
| 12 | 3.30–3.40, broad s | −9.2 | 58.70, 58.80, 65.30, 69.80, 70.26, 70.33, 70.50, 70.60, 70.70, 71.70, 72.00, 77.20, 78.4 | −81 | |
|   | 3.45–3.55, broad s | | | | |
|   | 3.55–3.75, broad s | | | | |
|   | 3.75–3.85, broad s | | | | |
|   | 3.85–4.10, broad s | | | | |
| 13 | | −9.2 | | −82 | |
| 14 | | | | | |
| 15 | | | | | |
| 16 | | | | | |

SIDE GROUP SYNTHESIS

Polymer and Small Molecule Compound Synthesis and Characterization

Polymers 3 to 16 were prepared by reacting the sodium salt of the appropriate hydroxy functionalized compound with a previously prepared solution of poly(dichlorophosphazene), 2, in dry THF (Scheme 1).

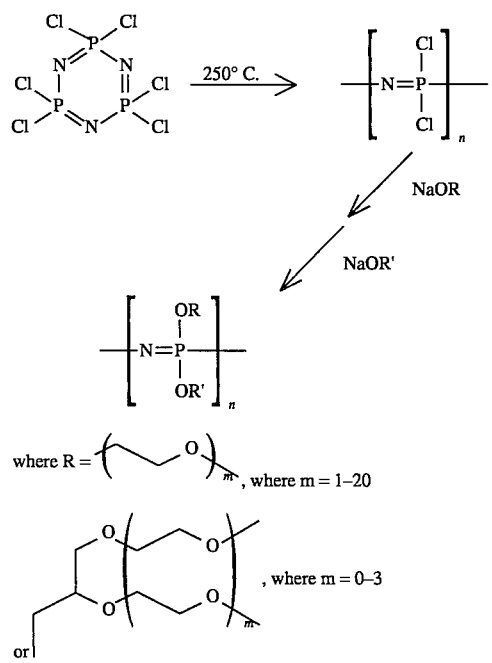

Scheme 1

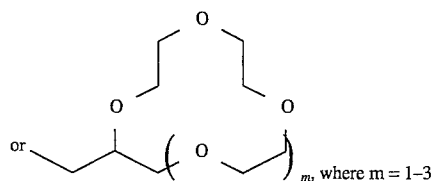

and R' = O(CH$_2$)$_n$CH$_3$ or R

Poly(dichlorophosphazene), 17, was synthesized according to the method described by Allcock (Allcock, H. R. and Kugel, R. L. *J. Am. Chem. Soc.* 1965, 87, 4216). The polymers were purified by dialysis, and characterized by $^1$H-NMR, $^{13}$C-NMR, and $^{31}$P-NMR and elemental analysis. The polymer molecular weights were determined by gel permeation chromatography. The glass transition temperatures of the polymers were measured by differential scanning calorimetry (DSC).

POLYPHOSPHAZENES BEARING BOTH COORDINATING AND NON-COORDINATING SIDE GROUPS

Polymer Synthesis. Poly(dichlorophosphazene) (17) was prepared by the thermal ring opening polymerization of hexachlorocyclotriphosphazene (Allcock, H. R.; Kugel, R. L. *J. Am. Chem. Soc.* 1965, 87, 4216) (Allcock, H. R.; Kugel, R. L.; Valan, K. J. *Inorg. Chem.* 1966, 5, 1709) (Allcock, H. R.; Kugel, R. L. *Inorg. Chem.* 1966, 5, 1716) (1) (Scheme 2). Polymers 18–25 were synthesized by allowing one equivalent of sodium methoxyethoxyethoxide to react with polymer 17 in tetrahydrofuran (THF) to generate [NPCl$_1$(OCH$_2$CH$_2$OCH$_2$CH$_2$OCH$_3$)$_1$]$_n$. This macromolecular intermediate was treated with an excess of the sodium salt of the corresponding alcohol. All polymers were purified by dialysis against water (7 d) followed by either methanol or ethanol (7 d, depending on solubility).

Scheme 1

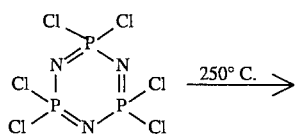

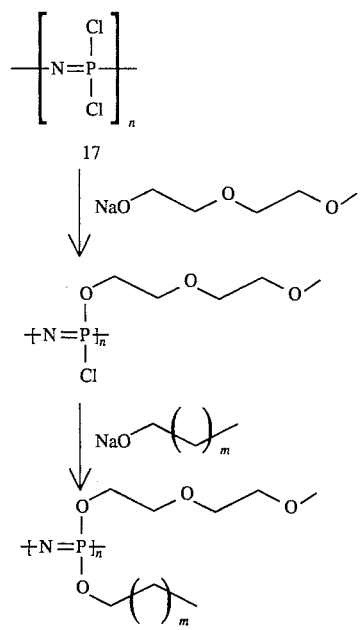

18: m = 1
19: m = 2
20: m = 3
21: m = 4
22: m = 5
23: m = 6
24: m = 7
25: m = 8

Polymer Characterization. The spectral, molecular weight and analytical data of polymers 18–25 are given in Table 5. The side group loadings of polymers 18–25 were estimated from the relative intensities in the $^1$H NMR spectrum of the terminal methoxy unit of the methoxyethoxyethoxy side group vs. the methyl group of the n-alkyl cosubstituent. These data were confirmed by the elemental analysis. All polymers exhibited a sharp singlet in the $^{31}$P NMR spectrum, which indicated total chlorine replacement. The absence of residual chlorine was confirmed by the analytical data. The copolymer composition ratios and glass transition temperatures of polymers 18–25 containing varying amounts of straight chain alkoxy- and 2-(2-methoxyethoxy)ethoxy side groups are shown in Table 5.

TABLE 5

| | | | | | | | |
|---|---|---|---|---|---|---|---|
| | | Polyphosphazene Characterization Data | | | | | |
| | | $^{13}$C NMR, | $^{31}$P NMR, | mol wt (GPC) | | elem. anal. | |
| Polymer | $^1$H NMR, ppm. | ppm. | ppm. | M$_w$ (× 10$^5$) | M$_w$/M$_n$ | calc'd | found |
| 18 | 4.05(br, OCH$_2$); 3.9(br, POCH$_2$); 3.6(br, m, OCH$_2$); 3.5(br, m, OCH$_2$); 3.35(s, OCH$_3$); 1.6(br, m, CH$_2$); 1.4(br, m, CH$_2$); 0.9 (br, t, CH$_3$) | 72.0, 70.4, 70.3, 64.9, 58.9, 32.5, 19.0, 13.9 | −7.6 | 6.38 | 3.03 | C, 42.72; H, 7.98; N, 5.61; Cl, 0. | C, 40.11; H, 8.08; N, 6.30; Cl, 0.096. |
| 19 | 4.0(br, OCH$_2$); 3.9(br, t, POCH$_2$); 3.65(m, OCH$_2$); 3.5(m, OCH$_2$); 3.35(s, OCH$_3$); 1.6(br, m, CH$_2$); 1.35(br, m, CH$_2$); 0.9 (br, t, CH$_3$) | 72.0, 70.5, 70.3, 65.4, 64.6, 58.9, 32.5, 19.0, 13.9 | −7.6. | 6.41 | 2.92 | C, 45.41; H, 8.47; N, 5.86; Cl, 0. | C, 45.57; H, 8.49; N, 5.40; Cl, 0.555. |
| | 4.0(br, OCH$_2$); 3.9(br, t, | | | | | | |

TABLE 5-continued

| Polymer | $^1$H NMR, ppm. | $^{13}$C NMR, ppm. | $^{31}$P NMR, ppm. | mol wt (GPC) $M_w$ (× $10^5$) | $M_w/M_n$ | elem. anal. calc'd | found |
|---|---|---|---|---|---|---|---|
| 20 | POCH$_2$); 3.65(m, OCH$_2$); 3.5(m, OCH$_2$); 3.35(s, OCH$_3$); 1.55(br, m, CH$_2$); 1.35(br, m, CH$_2$); 0.9(br, t, CH$_3$) | 72.0, 70.5, 70.3, 65.6, 64.7, 58.9, 30.2, 28.0, 22.5, 14.1 | −7.6 | 4.17 | 2.82 | C, 47.50; H, 8.77; N, 5.54; Cl, 0. | C, 44.69; H, 8.59; N, 5.79; Cl, 0.038. |
| 21 | 4.04(br, OCH$_2$); 3.88(br, t, POCH$_2$); 3.64(m, OCH$_2$); 3.50(m, OCH$_2$); 3.40(s, OCH$_3$); 1.55(br, m, CH$_2$); 1.29(br, m, CH$_2$); 0.89(br, t, CH$_3$) | 72.0, 70.6, 70.4, 65.7, 65.0, 58.9, 31.8, 30.6, 25.7, 22.7, 14.1. | −7.6 | 4.07 | 1.28 | C, 49.72; H, 9.89; N, 5.25; Cl, 0 | C, 48.84; H, 9.06; N, 5.22; Cl, 340 ppm. |
| 22 | 4.05(br, OCH$_2$); 3.9(br, POCH$_2$); 3.65(br, OCH$_2$); 3.50(m, OCH$_2$); 3.40(s, OCH$_3$); 1.65(br, CH$_2$); 1.3(br, CH$_2$); 0.9(br, t, CH$_3$) | 72.0, 70.5, 70.3, 65.7, 64.7, 58.9, 32.0, 30.7, 29.4, 26.0, 22.7, 14.1. | −7.6 | 4.11 | 1.72 | C, 51.60; H, 9.38; N, 5.01; Cl, 0. | C, 49.76; H, 9.64; N, 5.33, Cl, 193 ppm. |
| 23 | 4.04(br, OCH$_2$); 3.87(br, POCH$_2$); 3.63, m, OCH$_2$); 3.49(m, OCH$_2$); 3.35(s, OCH$_3$); 1.56(br, m, CH$_2$); 1.25(br, m, CH$_2$); 0.89(br, t, CH$_3$) | 72.0, 70.6, 70.3, 65.7, 64.7, 58.9, 32.0, 30.7, 29.8, 29.5, 26.1, 22.7, 14.1 | −7.6 | 4.76 | 2.82 | C, 54.06; H, 9.76; N, 4.76; Cl, 0 | C, 53.09; H, 10.03; N, 4.90; Cl, 323 ppm. |
| 24 | 4.0(br, OCH$_2$); 3.9(br, t, POCH$_2$); 3.65(m, OCH$_2$); 3.5(m, OCH$_2$); 3.35(s, OCH$_3$); 1.6(br, CH$_2$); 1.3 (br, CH$_2$); 0.9(br, t, CH$_3$) | 72.0, 70.5, 70.3, 65.7, 64.7, 58.9, 32.0, 30.7, 29.9, 29.5, 26.1, 22.7, 14.1 | −7.6 | 6.16 | 3.85 | C, 55.27; H, 9.93; N, 4.54; Cl, 0. | C, 53.77; H, 10.08; N, 4.47; Cl, 0.044. |
| 25 | 4.1(br, s, OCH$_2$); 3.9(br, t, POCH$_2$); 3.65(br, m, OCH$_2$); 3.5(br, m, OCH$_2$); 3.3(s, OCH$_3$); 1.7(br, CH$_2$); 1.55(br, CH$_2$); 1.3 (br, CH$_2$); 0.9(br, t, CH$_3$) | 72.0, 70.5, 70.3, 66.3, 61.2, 32.0, 29.6, 29.5, 26.1, 22.7, 14.1 | −7.6 | 5.11 | 4.65 | C, 55.45; H, 9.94; N, 4.39; Cl, 0. | C, 50.97; H, 9.29; N, 4.86; Cl, 0.25. |

Polymer Glass Transition Temperatures ($T_g$). The glass transition temperatures of cosubstituted polymers 18–25 containing varying amounts of straight chain alkoxy- and 2-(2-methoxyethoxy)ethoxy side groups are shown in Table 6. All methoxyethoxyethoxy (MEE) cosubstituent polymers posses $T_g$'s in the region of −95° to −83° C., with the exception of polymer 25, which possesses a $T_g$ at −74° C. While no clear trend of $T_g$ as a function of cosubstituent is found, polymers 21–25 posses $T_g$'s lower than both the corresponding alkoxy homopolymer and MEEP ($T_g$=−84° C.) (see Table 7) which indicates a greater influence on the $T_g$ by the MEE cosubstituent. The thermal data may also indicate that polymers 21–25 posses a higher degree of backbone flexibility than MEEP. Cosubstituent polymers 18–20 posses $T_g$'s higher than the corresponding alkoxy homopolymers (see Table 7) but lower than MEEP. This may suggest an equal contribution by each side group to the thermal properties of polymers 18–20.

TABLE 6

Polymer Composition and Thermal data for [NP(OCH$_2$CH$_2$OCH$_2$CH$_2$OCH$_3$)$_x$(OR)y]$_n$

| Polymer | R | X | Y | $T_g$, uncomplexed (°C.) | $T_g$, complexed (°C.) |
|---|---|---|---|---|---|
| 18 | (CH$_2$)$_2$CH$_3$ | 0.97 | 1.03 | −87 | −74 |
| 19 | (CH$_2$)$_3$CH$_3$ | 1.04 | 0.96 | −93 | −78 |
| 20 | (CH$_2$)$_4$CH$_3$ | 1.05 | 0.95 | −85 | −81 |
| 21 | (CH$_2$)$_5$CH$_3$ | 0.96 | 1.04 | −95 | −82 |
| 22 | (CH$_2$)$_6$CH$_3$ | 1.06 | 0.94 | −94 | −85 |
| 23 | (CH$_2$)$_7$CH$_3$ | 1.08 | 0.92 | −90 | −74 |
| 24 | (CH$_2$)$_8$CH$_3$ | 0.95 | 1.05 | −84 | −71 |
| 25 | (CH$_2$)$_9$CH$_3$ | 1.05 | 0.95 | −74 | −66 |

TABLE 7

Thermal Data for $[NP\{O(CH_2)_m CH_3\}_2]_n$

| m | $T_g$ | $T_m$ |
|---|-------|-------|
| 2 | −100  |       |
| 3 | −105  |       |
| 4 | −95   |       |
| 5 | −85   |       |
| 6 | −74   | −10   |
| 7 | −55   | 0     |
| 8 | −44   | 10    |
| 9 | −33   | 22    |

Thermal Analysis of Complexed Samples. Polymer 25 was complexed with $LiSO_3CF_3$ in varying ratios and the $T_g$ detected by differential scanning calorimetry (DSC). The $T_g$ of uncomplexed polymer 25 is −74° C., which increases rapidly to −52° C. in the 1.12:1 polymer to salt mole ratio sample. Due to a reduced polymer fluidity (H Cheradame, IUPAC Macromolecules, eds. H. Benoit and P. Rempp (Pergamon Press, New York, 1982) p. 251). The gradual increase in $T_g$ as the salt content is increased is attributed to polymer chain immobilization by lithium ion-induced crosslinks which would occur via coordination of the oxygen atoms to lithium ions. The region of the glass transition also broadens greatly relative to uncomplexed polymer 25. This broadening of the region of the $T_g$ is consistent with cross-linking, which may occur via the coordination of the oxygen atoms to lithium ions.

Impedance Analysis of Complexed Samples. Polymer 25 was complexed with $LiSO_3CF_3$ in varying ratios and the ionic conductivity measured by impedance analysis to determine the optimum loading of salt. At a polymer to salt mole ratio of 23.81:1, the conductivity jumped to approximately $3 \times 10^{-6}$ S/cm from below $10^{-8}$ S/cm. As the $LiSO_3CF_3$ loading is increased to a ratio of 9.24:1 the conductivity rises further to a maximum of $1.06 \times 10^{-5}$ S/cm. The optimum polymer to salt ratio of 9.24:1 reflects an expected decrease in the $LiSO_3CF_3$ capactity of polymer 25 relative to that of MEEP (optimum loadong 4:1) due to a decrease in the number of coordinating oxygen atoms. Increased loadings of $LiSO_3CF_3$ up to 1.12:1 resulted in sharply decreased conductivity, presumably due to a decrease in the ionic mobility (H Cheradame, IUPAC Macromolecules, eds. H. Benoit and P. Rempp (Pergamon Press, New York, 1982) p. 251) (Papke, B. L, Ratner, M. A.; Shriver, D. F. J. *Electrochem. Soc.* 1982, 129, 1694).

The optimum polymer to salt ratio of 9.24:1 for polymer 25 was used to prepare $LiSO_3CF_3$ complexes of polymers 18–24 to evaluate the effect of the polymer cosubstituent. Complexes of polymers 23–25 all posses similar conductivities. However, as the length of the alkoxy cosubstituent is decreased from eight atoms in polymer 22 to four atoms in polymer 18, an increase in the ionic conductivity is observed, with that of polymer 18 being $5.3 \times 10^{-5}$ S/cm, twice that of MEEP at a similar polymer to salt ratio.

The increase in conductivity may be explained by the longer alkoxy cosubstituents in polymers 23–25 serving to hinder the terminal MEE oxygen atom coordination to lithium ions. As the number of atoms in the non-coordinating cosubstituent is decreased to 8, the same number of atoms in the MEE side group, the methoxy oxygen atom may become less hindered and more able to coordinate lithium atoms. As the alkoxy cosubstituent is further shortened additional ether oxygen atoms become able to coordinate and the conductivity further rises to an observed maximum of $5.3 \times 10^{-5}$ S/cm.

The conductivity of the polymer 18 complex, twice that of MEEP, may be explained in terms of free volume. The phosphorus atoms in polymer 18 bear, on average, one MEE group and one propoxy group. The presence of a group which is less sterically demanding then the MEE group may result in an increased free volume of the MEE group, which results in a conductivity greater than that of MEEP.

CONCLUSIONS

The glass transitions of cosubstituent polymers 18–25 were investigated with the aid of DSC. Polymers 18–24 posses $T_g$'s in the region of −95° to −83° C., with the highest $T_g$ being that of polymer 25, which exhibits a $T_g$ at −74° C. The thermal data indicates that all polymers have similar backbone mobilities to MEEP, and that polymers 18–24 may posses a degree of backbone mobility greater than that of MEEP.

The thermal data for complexes of polymer 25 with $LiSO_3CF_3$ indicates that at a 23.81:1 polymer to salt ratio, the backbone mobility is only minimally affected. At higher loadings there is a rise in the $T_g$, which increases to −52° C. at a ratio of 1.12:1. This can be attributed to ionic crosslinks, which form via ether oxygens coordinating to lithium cations, which would serve to lower polymer mobility.

The optimum salt loading for polymer 25 complexed with $LiSO_3CF_3$ was determined to be 9.24:1 polymer to salt ratio. At lower ratios, the conductivity declines rapidly which may reflect decreased ionic mobility due to ionic crosslink formation.

Lastly, the optimum polymer to salt mole ratio of 9.24:1 determined for polymer 10 was used to examine the effect of varying the length of the non-coordinating alkoxy cosubstituent. While polymers 23–25 show conductivities in the region of $5 \times 10^{-5}$ S/cm, as the length of the alkoxy cosubstituent is shortened a rapid rise in the conductivity is observed, with polymer 18 exhibiting a conductivity of $5.3 \times 10^{-5}$ S/cm. These effects may be explained in terms of alkoxy side group sterics and free volume effects.

EXPERIMENTAL SECTION

Equipment. High field $^{31}P$ (146 MHz), $^{13}C$ (90 MHz) and $^1H$ (360 MHz) NMR spectra were obtained by using a Brucker WM360 spectrometer. Both $^{13}C$ and $^{31}P$ spectra were proton decoupled unless otherwise specified. $^{31}P$-NMR spectra were referenced to external 85% $H_3PO_4$ with positive shifts recorded downfield of the reference. $^1H$ and $^{13}C$ were referenced to external tetramethylsilane. Elemental analysis were obtained by Galbraith Laboratories Knoxville, Tenn. Electron-impact mass spectra (EI/MS) were obtained with the use of Kratos MS 9/50 equipment. Chemical ionization (CI) mass spectra were obtained o using a Kratos MS-25 spectrometer. Molecular weights were determined with a Hewlett-Packard HP 1090 gel permeation chromatograph equipped with a HP-1037A refractive index detector and a polymer Laboratories PL gel 10 mm column. The samples were eluted with a 0.1% by weight solution of tetra-n-butyl ammonium bromide in THF. The GPC column was calibrated with polystyrene standards (Waters) and with fractionated samples of poly[bis(trifluorethoxy)phosphazene] provided by Drs. R. Singler and G. Hagnauer of the U.S. Army Materials Research Laboratories, Watertown, Mass. Glass transition temperatures were determined by differential scanning calorimetry (DSC) using a Perkin-Elmer-7 thermal analysis system equipped with a Perkin-Elmer 7500 computer. Polymer samples 3 to 16 were heated from −100° to +165° C. Heating rates of 10°, 20° and 40° C./min. under a nitrogen atmosphere were used. The glass transition temperatures were determined by extrapolation to zero heating rate. Sample sizes were between 10 and 30 mg. Conductivity measurements were made using a Hewlett Packard 4192A LF Impedance Analyser with an a.c. frequency range of 5 Hz to 13 MHz. All conductivity measurements were carried out in an argon filled dry box.

Materials. Hexachlorocyclotriphosphazene, (1), $(NPCl_2)_3$, (Ethyl Corp.) was purified by recrystallization from hexane followed by sublimation at 40° C. (0.05 torr). Poly(dichlorophosphazene), (2) was prepared by the ring-opening polymerization of (1) at 250° C. This method has been previously reported (Allcock, H. R. and Kugel, R. L. *J. Am. Chem. Soc.* 1965, 87, 4216). Tetrahydrofuran (THF) was dried over sodium benzophenone ketyl and was distilled in an atmosphere dry nitrogen before use. All other reagents (Aldrich) were used as received. Reactions that involved the use of chlorophosphazenes were carried out in an atmosphere of dry nitrogen or argon.

SYNTHESIS OF HYDROXY-FUNCTIONALIZED PODAND COMPOUNDS

Synthesis of 3-tert-butoxy-1,2-propanediol, (17). Compound 17 was prepared by the method described by Montanari and Tundo (Montanari, F. and Tundo, P., *J. Org. Chem.* 1982, 47, 1298). tert-Butyl glycidyl ether (Aldrich), (141 ml, 1.0 mol.) was added dropwise to 99% formic acid (83 ml, 2.2 mol). The reaction mixture was stirred and the temperature was maintained below 30° C. The mixture was stirred at room temperature for 12 hours. A solution of sodium hydroxide (100 g, 2.5 mol.) in 125 ml of water was added slowly, keeping the temperature below 40° C. The organic fraction was separated and the aqueous phase was extracted several times with dichloromethane. The combined organic fractions were dried ($MgSO_4$) and evaporated and the oily residue was distilled under vacuum to give 17 (75 g, 54%) as a colorless oil: (bpt. 55°–60° C., 0.015 torr): IR 3400 (OH) $cm^{-1}$; $^1H$-NMR ($CDCl_3$) d (ppm) 3.25–4.0 (m, 7H), 1.2 (s, 9H); $^{13}C$-NMR ($CDCl_3$) d (ppm) 73.5, 70.5, 64.4, 63.6, and 27.16. Mass spectrosocopy, m/e: 148 $M^+$ base peak (Scheme 3).

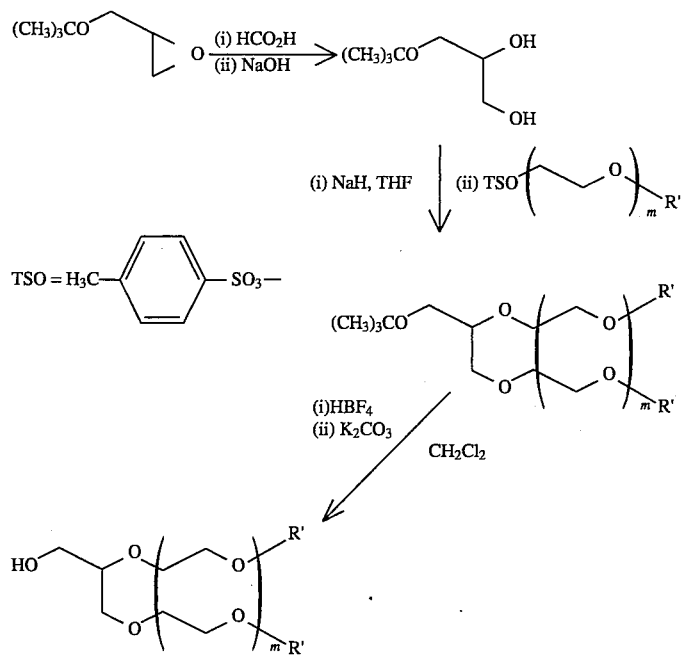

Reaction Scheme 3

Synthesis of Hydroxy Functionalized Podand Compounds when m = 1 and R' = —$CH_3$ compound 29
when m = 1 and R' = —$(CH_2)_3$ compound 31
when m = 1 and R' = —$CH(CH_3)_2$ compound 32
when m = 2 and R' = —$CH_3$ compound 33
when m = 3 and R' = —$CH_3$ compound 34

Synthesis of 2-(2'-(methoxy ethoxy)ethyl-toluene-p-sulfonate (18). Compound 18 was prepared according to the method described by Gokel et al (Schultz, R. A.; White, B. D.; Dishong, D. M.; Arnold, K. A. and Gokel, G. W. *J. Am. Chem. Soc.* 1985, 107, 6660). A slurry of p-toluene sulfonyl chloride (189.8 g, 0.996 mol.) and pyridine (200 ml) was mechanically stirred in a three necked $N_2$ flushed flask. The temperature of the reaction mixture was maintained at approximately 5° C. (dry ice-ethanol bath), while the desired 2-(2'-methoxy ethoxy)ethanol (119.5 g, 0.996 mol.) was added slowly from an addition funnel. After the addition was complete, the mixture was stirred for 15 minutes. The mixture was poured into ice water (900 ml) and washed with dichloromethane (900 ml). The organic layer was washed with ice-cold 6N HCl (3×500 ml) and dried ($MgSO_4$) and reduced to a minimum volume by evaporation to yield a colorless oil (168.0 g, 61%): $^1H$-NMR ($CDCl_3$) d (ppm) 7.3–7.7 (m, 4H, aromatic), 3.45–4.2 (m, 8H) 3.35 (s, 3H) 2.5 (s, 3H); $^{13}C$-NMR ($CDCl_3$), d (ppm) 21.5, 58.8, 69.2, 69.9, 127.8, 129.9, 133.0, 144.9. Mass spectroscopy, m/e: 274 M+ base peak.

Synthesis of 2-n-butoxy ethyl-toluene-p-sulfonate (19). Compound 19 was prepared as described for the 18. The reagents used were as follows, p-toluene sulfonyl chloride (194 g, 1.019 mol.), pyridine (200 ml) and 2-(n-butoxy)ethanol (110 g, 0.932 mol.) (Aldrich). The final product was colorless oil (184 g, 68%): $^1$H-NMR (CDCl$_3$), d (ppm) 7.8 (d, 2H aromatic), 7.35 (d, 2H, aromatic), 4.15 (t, 2H, etheric CH$_2$), 3.6 (t, 2H, etheric CH$_2$), 3.4 (t, 2H, etheric CH$_2$), 2.45 (s, 3H, p-aromatic-CH$_3$), 1.5 (m, 2H, CH$_2$), 1.3 (m, 2H, CH$_2$), 0.9 (t, 3H, —CH$_3$). Mass spectroscopy, m/e 273 MH+ base peak.

Synthesis of 2-sec-propoxy ethyl-toluene-p-sulfonate (20). Compound 20 was prepared as described for the synthesis of 18. The reagents used were as folloows, p-toluene sulfonyl chloride (190 g, 1.0 mol.), pyridine (200 ml.) and 2-(sec-propoxy)ethanol (100 g, 0.962 mol.) (Aldrich). The final product was a colorless oil (194 g, 82%): $^1$H-NMR (CDCl$_3$), d, (ppm) 7.8 (d, 2H, aromatic), 7.35 (d, 2H, aromatic), 4.15 (t, 2H, etheric CH$_2$), 3.5–3.6 (m, 3 H, CH$_2$, CH), 2.40 (s, 3H, p-aromatic-CH$_3$), 1.1 (d, 6H, CH-CH$_3$). Mass spectroscopy, m/e 258 MH+ base peak.

Synthesis of 2-methoxy ethyl-toluene-p-sulfonate (21). Compound 21 was prepared using the same method described for the preparation of compound 18. The reagents and quantifies used were as follows, p-toluene sulfonyl chloride (210.65 g, 1.1 mol.), pyridine (200 ml) and 2-(methoxy)ethanol (76.0 g, 1.0 mol.). The final product was a colorless oily liquid (120 g, 52%) (bpt. 110–115° C., 0.01 torr): $^1$H-NMR (CDCl$_3$), d, (ppm) 7.3–7.7 (m, 4H, aromatic), 3.4–4.2 (m, 4H), 3.35 (s, 3H), 2.5 (s, 3H); $^{13}$C-NMR (CDCl$_3$), d, 144.5, 133.0, 129.8, 127.8, 70.0, 69.0, 58.9, and 21.5. Mass spectroscopy, m/e: 230 M+ base peak.

Synthesis of 2-(2'-(2"-methoxy ethoxy)ethoxy)ethyl-toluene-p-sulfonate (22). Compound 22 was prepared using the method described for the synthesis of compound 18. The reagents used were as follows, p-toluene sulphonyl chloride (170.4 g, 0.894 mol.), pyridine (400 ml) and 2-(2'-(2"-methoxy ethoxy)ethoxy)ethanol (148.7 g, 0.907 mol.) (Aldrich). The final product was a pale yellow liquid (122 g, 42%): $^1$H-NMR (CDCl$_3$), d (ppm) 7.3–7.7 (m, 4H aromatic), 3.3–4.2 (m, 12H) 3.35 (s, 3H), 2.4 (s, 3H). Mass spectroscopy, m/e: 318 M+.

Synthesis of 1-tert-butyloxy-2,3-di-(2-methoxy ethoxy)propane (23). Compound 21 (31.0 g, 0.135 mol.) was added to a slurry of the di-sodium salt of 3-tert-butoxy-1,2-propane diol, (0.062 mol.), 17, in refluxing in dry THF (500 ml). The reaction mixture was stirred, heated and maintained at reflux under an atmosphere of dry nitrogen for 24 hours. The mixture was allowed to cool and filtered and the solvent was removed by evaporation under vacuum. The residue was extracted with chloroform, dried (MgSO$_4$) filtered and solvent removed by vacuum rotary evaporation to yield a brown liquid (17.0 g). The crude product was washed with water (250 ml) and extracted with chloroform (300 ml). The organic fraction was separated from the aqueous and dried (MgSO$_4$) filtered. The solvent was removed by rotary evaporation under vacuum to give a pale yellow oil (15.0 g, 94%). The crude product was distilled (bpt. 120°–125° C., 0.25 torr) to give a colorless oily liquid (11.1 g, 67%): IR 2975, 2875 (CH) cm$^{-1}$, 1198 (COC) cm$^{-1}$, 1108 (COC) cm$^{-1}$, $^1$H-NMR (CDCl$_3$), d (ppm) 3.3–3.85 (m, 19H), 1.3 (s, 9H, tert-butyl), $^{13}$C-NMR (CDCl$_3$), d, (ppm) 78.95, 72.94, 72.21, 71.92, 71.74, 70.64, 69.69, 61.73, 58.98, 58.8, 27.43. Mass spectroscopy, m/e: 264 M+; 208 (M-C(CH$_3$)$_3$)+ base peak.

Elemental analysis: Found C, 59.1%; H, 10.5%, C$_{13}$H$_{28}$O$_5$ requires C, 59.09%; H, 10.61%.

Synthesis of 1-tert-butyloxy-2,3-di(2-n-butoxy ethoxy)propane (25). Compound 25 was prepared using a method similar to that described for 23. The o reagents used were as follows, compound 17 (25.5 g, 0.172 mol.), compound 19 (91.5 g, 0.336 mol.), sodium hydride (60% by wt. in mineral oil (14.0 g, 0.350 mol.). The final product was a colorless liquid (30.0 g 60%) (bpt. 100°–120 0° C., 0.06 torr.): $^1$H-NMR (CDCl$_3$), d (ppm) 3.8–3.4 (m, 17H), 1.55 (m, 4H, CH$_2$), 1.2 (s, 9H, C(CH$_3$)$_3$), 0.9 (t, 6H, —CH$_3$). Mass spectroscopy, m/e 349 MH+.

Elemental analysis: Found C, %; H, %, C$_{19}$H$_{40}$O$_5$ requires C, 65.51%; H 11.49,%.

Synthesis of 1-tert-butyloxy-2,3-di(2-sec-propoxy ethoxy)-propane (26). Compound 26 was prepared as described for 23. The reagents used were as follows, compound 17 (18.5 g, 0.125 mol.), compound 20 (65.0 g, 0.252 mol.), sodium hydride (60% by wt. in mineral oil) (15.0 g, 0.375 mol.). The final yield was a colorless liquid (27.0 g, 68%) (bpt. 90°–100° C., 0.04 torr): 1H-NMR (CDCl$_3$), d (ppm) 3.8–3.4 (m, 15H), 1.15 (s, 9H, C(CH$_3$)$_3$), 1.12 (d, 12H, CH(CH3)2). Mass spectroscopy, m/e MH+.

Synthesis of 1-tert-butyloxy-2,3-di-(2-(2'-methoxy ethoxy)ethoxy) propane (27). Compound 27 was prepared using the method described for the synthesis of compound 23. The reagents used were as follows, compound 17 (35.0 g, 0.236 mol.), compound 18 (125.0 g, 0.456 mol.), sodium hydride (60% emulsion in mineral oil) (25.0 g, 0.625 mol.) and THF (1500 ml). The final product was a colorless oily liquid (bpt. 124°–131° C., 0.02 torr) (29.11 g, 35%): IR 2972, 2872 (CH) cm$^{-1}$, 1198 (COC) cm$^{-1}$, 1108 (COG) cm$^{-1}$, $^1$H-NMR (CDCl$_3$), d (ppm) 3.3–3.8 (m, 27H), 1.25 (s, 9H tert-butyl). $^{13}$C-NMR (CDCl$_3$), d (ppm) 78.92, 71.88, 71.92, 71.55, 70.73, 70.54, 70.48, 70.41, 69.75, 61.63, 58.97, 27.41 Mass spectroscopy, m/e: 352 M+; 296 (M-C(CH$_3$)$_3$)+ base peak, Elemental Analysis: Found C, 58.6%; H, 10.2%, C$_{17}$H$_{36}$O$_7$ requires C, 57.95%; H, 10.23%.

Synthesis of 1-tert-butyloxy-2,3-di-(2-(2'-(2"-methoxy ethoxy)ethoxy)ethoxy)propane (28). Compound 28 was prepared using the method described for the synthesis of compound 23. The reagents used were as follows, compound 17 (25.0 g, 0.169 mol.), compound 22 (122.0 g, 0.384 mol.), sodium hydride (60% emulsion in mineral oil) (15.0 g, 0.375 mol.) and THF (1500 ml). The final product was a colorless oily liquid (bpt. 209°–211° C., 0.05 torr): IR 2872 (CH) cm$^{-1}$, 1198 (COC) cm$^{-1}$, 1108 (COG) cm$^{-1}$, $^1$H-NMR (CDCl$_3$), d (ppm) 3.75–3.8 (m, 4H), 3.4–3.7 (m, 25H), 3.36–3.4 (s, 6H), 1.19 (s, 9H). Mass spectroscopy, m/e: 440 M+; 383 (M-C(CH$_3$)$_3$)+ base peak.

Elemental Analysis: Found C, 57.2%: H, 9.9%, C$_{21}$H$_{44}$O$_9$ requires C, 57.27%; H, 10.0%.

Synthesis of 2,3-di-(2-methoxy ethoxy)propanol (29). Compound 29 was prepared by a method similar to that described by Montanari and Tundo[20] for the synthesis of 2-(hydroxy methyl)-1,4,7,10,13,16-hexaoxacyclooctadecane. KBF$_4$ complex, (2-(hydroxy methyl)-18-crown-6). To a solution of compound 23 (10.0 g, 0.038 mol.) in dichloromethane (100 ml) was added tetrafluoroboric acid-diethyl ether complex (54% in diethyl ether), (13.7 ml). The mixture was left stirring at room temperature for 20 minutes. The acid was neutralized with solid potassium carbonate, inorganic salts were filtered, the solvent was removed by rotary evaporation to give a pale yellow oil. The crude product was distilled under vacuum (bpt. 94°–95° C., 0.02 torr) to give a colorless liquid (18.75 g, 78%): $^1$H-NMR (CDCl$_3$), d (ppm) 3.5–3.9 (m, 13H), 3.35–3.4 (s, 6H), 2.75–2.8 (s, 1H); $^{13}$C-NMR (CDCl$_3$), d (ppm) 79.56, 72.07, 71.73, 71.16, 70.59, 69.35, 62.40, 58.83, 58.75.

Mass spectroscopy, m/e: 209 M$^+$ base peak. Elemental Analysis: Found C, 52.1%; H, 9.5%, C$_9$H$_{20}$O$_5$ requires C, 51.92%; H, 9.62%.

Synthesis of 2,3-di-(2-n-butoxy ethoxy)propanol (31). Compound 31 was prepared as described for 29. The reagents used were as follows, compound 25 (38.0 g, 0.109 mol.), tetrafluoroboric acid-diethyl ether complex ( 22 ml of a 54% solution in diethyl ether) dichloromethane (100 ml) and excess potassium carbonate. The final yield was a colorless liquid (17.3 g, 59%), (bpt. 95°–120° C., 0.04 torr): $^1$H-NMR (CDCl$_3$), d, (ppm). Mass spectroscopy, m/e 293 MH$^+$.

Synthesis of 2,3-di-(2-sec-propoxy ethoxy)propanol (32). Compound 32 was prepared as described for 29. The reagents used were as follows, compound 26 (g, mol.), tetrafluoroboric acid-diethyl ether complex ml of a 54% solution in diethyl ether), dichloromethane (100 ml) and excess potassium carbonate. the final yield was a colorless liquid (g, %), (bpt. °C., torr.): $^1$H-NMR (CDCl$_3$), d, (ppm). Mass spectroscopy, m/e M$^+$.

Synthesis of 2,3-di-(2-(2'-methoxy ethoxy)ethoxy)propanol (33). Compound 33 was prepared using the method described for the synthesis of compound 29. The reagents used were as follows, compound 27 (23.5 g, 0.0668 mol.), tetrafluoroboric acid (54% in diethylether) (14.1 ml), excess potassium carbonate. The final was a colorless liquid bpt (125°–140° C., 0.040 torr) (9.6 g, 49%): $^1$H-NMR, d (ppm),. Mass spectroscopy, m/e: 296 M$^+$ base peak.

Elemental Analysis: Found C, 52.7%; H, 9.5%, C$_{13}$H$_{28}$O$_7$ requires C, 52.81%; H, 9.46%.

Synthesis of 2,3-di-(2-(2'-(2"-methoxy ethoxy)ethoxy)ethoxy)-propanol (34). Compound 34 was prepared using the method described for the synthesis of conpound 29. The reagents used were as follows, compound 28 (27.5 g, 0.063 mol.), fluroboric acid (13.5 ml of a 54% solution in diethyl ether), excess potassium carbonate and dichloromethane (100 ml). The final product was a pale yellow oil (21.0 g, 88%), (bpt 178° C., 0.01 torr): IR 3474 (OH) cm$^{-1}$, 2872 (CH) cm$^{-1}$, 1198 (COC) cm$^{-1}$, 1108 (COC) cm$^{-1}$, $^1$H-NMR (CDCl$_3$), d (ppm) 3.5–4.0 (m, 27H), 3.35–3.4 (s, 6H). Mass spectroscopy, m/e: 385 M$^+$ base peak.

Synthesis of 2-(2-(2-(2-methoxyethoxy)ethoxy)ethoxy)ethanol (35) Synthesis of 2-(2-(2-(2-(2-(2-methoxyethoxy)ethoxy)ethoxy)ethoxyethoxy)ethanol. (36). Compounds 37 to 39 were purchased from Aldrich.

Polymer Synthesis

Synthesis of poly[bis(2-methoxyethoxy)phosphazene], (3). The final product 3 was obtained as a soft highly viscous material (g. %): $^1$H-NMR (CDCl$_3$), d, (ppm) 4.07, (br, 4H), 3.55 (t, 4H), 3.34 (s, 6H), $^{13}$C-NMR (CDCl$_3$), d, (ppm), 71.6, 64.8, 58.6, $^{31}$P-NMR (CDCl$_3$), d, (ppm), −7.5 (s).

Synthesis of poly[bis(2-(2-methoxyethoxy)ethoxy)]phosphazene, (4)

Synthesis of poly[bis(2-(2-methoxyethoxy)ethoxy)ethoxy)]phosphazene, (5). The final product 5 was obtained as a soft highly viscous liquid (g, %): $^1$H-NMR (CDCl$_3$), d, (ppm), 4.05 (br, 4H), 3.7–3.5 (br m, Synthesis of poly[bis(2-(2-(2-(2-mthoxyethoxy)ethoxy)ethoxy)phosphazene], (6)

Synthesis of poly[bis(2-(2-(2-(2-(2-(2-methoxyethoxy)ethoxy)ethoxy)ethoxy)ethoxy)phosphazene], (7)

Synthesis of poly[bis(2,3-di-(methoxy)propoxy)phosphazene, (8)

Synthesis of poly[bis(2,3-di-(2-methoxy ethoxy)propoxy)phosphazene], (9). The sodium salt of 29 (10.68 g, 0.052 mol.) was added to a stirring solution of poly(dichlorophosphazene), 2, (2.0 g, 0.017 mol.) in dry tetrahydrofuran (400 ml) under an atmosphere of argon. The reaction mixture was stirred and refluxed for 24 hours under argon and allowed to cool to room temperature. The reaction mixture was concentrated by evaporation under vacuum. The concentrated residue was dialysized first against distilled/deionized water and then methanol for several days. The solvent was removed by reduced pressure rotary evaporation to yield polymer 9, which was dried under vacuum at approximately 80° C. for three days. The final yield of polymer 9 was (6.3 g, 80%).

Synthesis of poly[bis(2,3-di-(2-n-butoxy ethoxy)propoxy)phosphazene], (10). Polymer 10 was prepared as described for the preparation of polymer 9. The reagents used were as follows, poly(dichlorphosphazene), 2, (g), sodium hydride (60% emulsion in mineral oil) (g, mol.) and THF (500 ml).

Synthesis of poly[bis(2,3-di-(2-sec-propoxy ethoxy)propoxy)phosphzene], (11). The synthesis of polymer 11 was as described for the 9. The reagents used were as follows, poly(dichlorophosphazene), 2, (g), sodium hydride (60% emulsion in mineral oil) (g, mol.) and THF (500 ml).

Synthesis of poly[bis(2,3-di-(2-(2'-methoxy ethoxy)ethoxy)propoxy)phosphazene, (12). The synthesis of polymer 12 was as described for 9. The reagents used were as follows, compound 29 (14.6 g, 0.049 mol.), poly(dichlorophosphazene), 2, (1.0 g), sodium hydride (60% emulsion in mineral oil) (1.9 g, 0.048 mol.) and THF (500 ml). Polymer 12 was obtained as a pale brown material (g, %).

Synthesis of poly[bis(2,3-di-(2-(2'-(2"-methoxy ethoxy)ethoxy)ethoxy)propoxy)phosphazene], (13). The synthesis of polymer 13 was as described for 9. The reagents used were as follows, compound 34 (g, mol.), poly(dichlrophosphazene) (g), sodium hydride (60% emulsion in mineral oil) (g, mol.) and THF (500 ml).

Synthesis of poly[bis((-1,4,7,10-tetracylclododecane)methoxy)phosphazene], (14). The synthesis of polymer 14 was as described for 9. The reagents used were as follows, compound 35 (g, mol.), poly(dichlorophosphzene), 2, (g), sodium hydride (60% emulsion in mineral oil) (g) and THF (500 ml).

Synthesis of poly[bis((-1,4,7,10,13-pentacyclotetradecane)methoxy)phosphazene], (15). Polymer 15 was prepared as described for 9. The follwing reagents were used, compound 36 (g, mol.), poly(dichlorophosphazene), 2, (g), sodium hydride (60% emulsion in mineral oil) (g) and THF (500 ml).

Synthesis of poly[bis((-1,4,7,10,13,16-hexacyclooctadecane)methoxy)phosphazene, (16). Polymer 16 was prepared as described for 9. The following reagents were used, compound 37 (g, mol.), poly(dichlorophosphazene), 2, (g), sodium hydride (60% emulsion in mineral oil) (g) and THF (500 ml).

Synthesis of Polymers 18–25: Polymers 18–25 were all prepared in an identical manner. The following preparation of 20 is typical. A suspension of 60% NaH (0.69 g, 17 mmol) and methoxyethoxyethanol (2.07 g, 17 mmol) in THF (75 mL) was stirred overnight at room temperature. A suspension of 60% NaH (1.03 g, 26 mmol) and pentyl alcohol (2.28 g, 26 mmol) was stirred warm overnight. Polydichlorophosphazene (2.0 g, 17 mmol) was dissolved in THF (450 mL) overnight with stirring. The THF solution of the sodium salt of methoxyethoxyethanol was added dropwise to the warm polymer solution and the mixture was stirred warm overnight. The THF solution of the sodium salt of pentyl alcohol was then added dropwise to the partially substituted polymer solution and the mixture was stirred warm overnight. The solvent was removed by rotary evaporation to leave a viscous solution which was dialyzed against water (7 d) and ethanol or methanol (depending on solubility). Full characterization is given in Tables 5 and 6.

Thus, while we have illustrated and described preferred embodiments of our invention, it is to be understood that this invention is capable of variation and modification, and we, therefore, do not wish or intend to be limited to the precise terms set forth, but desire and intend to avail ourselves of such changes and alterations which may be made for adapting the present invention to various usages and conditions. Accordingly, such changes and alterations are properly intended to be within the full range of equivalents and, therefore, within the purview of the following claims. The terms and expressions which have been employed in the foregoing specification are used therein as terms of description and not of limitation, and thus there is no intention in the use of such terms and expressions of excluding equivalents of features shown and described or portions thereof, it being recognized that the scope of the invention is defined and limited only by the claims which follow.

Thus is described our invention and the manner and process of making and using it in such full, clear, concise, and exact terms so as to enable any person skilled in the art to which it pertains, or to which it is most nearly connected, to make and use the same.

What is claimed is:

1. A polyphosphazene polymer of the following formula:

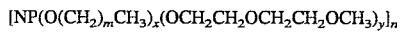

wherein x and y are approximately 1, m=2, and the value of n is such that the polymer is a flexible, amorphous polymer suitable for use as a solid polymer electrolyte.

2. A polymer according to claim 1, wherein n is approximately 15,000.

3. A polyphosphazene polymer of the following formula:

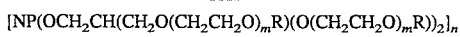

wherein m=0–3,

R is C1–C4 alkyl, and the value of n is such that the polymer is a flexible, amorphous polymer suitable for use as a solid polymer electrolyte.

4. A polymer according to claim 3, wherein m is 1 and n is approximately 15,000 and R is $(CH_2)_3CH_3$.

5. A polymer according to claim 3, wherein n is approximately 15,000.

6. A polymer according to claim 3, wherein R is $CH_3$, $(CH_2)_3CH_3$, or $CH(CH_3)_2$.

7. A polymer according to claim 6, wherein m=1–3 and n is approximately 15,000.

8. A polyphosphazene polymer of the following formula:

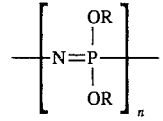

where R=

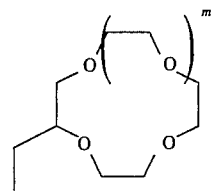

and where m=2–3 and the value of n is such that the polymer is a flexible, amorphous polymer suitable for use as a solid polymer electrolyte.

9. A polymer according to claim 8, wherein n is approximately 15,000.

* * * * *